(12) United States Patent
Zhang et al.

(10) Patent No.: US 7,832,115 B2
(45) Date of Patent: Nov. 16, 2010

(54) ELECTRONIC COORDINATOMETER

(75) Inventors: Minghua Zhang, Wuhan (CN); Qinxue Huang, Wuhan (CN); Bo Li, Wuhan (CN); Jinyong Yan, Wuhan (CN); Chunzheng Wang, Wuhan (CN)

(73) Assignee: Wuhan Leaddo Measuring & Control Co., Ltd., Wuhan (CN)

( * ) Notice: Subject to any disclaimer, the term of this patent is extended or adjusted under 35 U.S.C. 154(b) by 0 days.

(21) Appl. No.: 12/647,441

(22) Filed: Dec. 26, 2009

(65) Prior Publication Data

US 2010/0095546 A1     Apr. 22, 2010

Related U.S. Application Data

(63) Continuation of application No. PCT/CN2008/071935, filed on Aug. 8, 2008.

(30) Foreign Application Priority Data

Jul. 11, 2008   (CN) .......................... 2008 1 0048392

(51) Int. Cl.
 - *G01D 5/12* (2006.01)
 - *G01B 7/02* (2006.01)
 - *G01B 21/02* (2006.01)

(52) U.S. Cl. ............................... 33/706; 33/708; 33/700
(58) Field of Classification Search ............. 33/700, 33/701, 706, 707, 708; 235/495; 700/214
See application file for complete search history.

(56) References Cited

U.S. PATENT DOCUMENTS

| | | | | |
|---|---|---|---|---|
| 3,559,820 A | * | 2/1971 | Munson | 414/21 |
| 4,901,073 A | * | 2/1990 | Kibrick | 341/13 |
| 5,048,196 A | * | 9/1991 | Bernd et al. | 33/734 |
| 5,138,560 A | * | 8/1992 | Lanfer et al. | 235/454 |
| 5,634,746 A | * | 6/1997 | Ffield et al. | 408/1 R |
| 6,628,115 B2 | * | 9/2003 | Sasaki et al. | 324/207.17 |
| 6,845,912 B2 | * | 1/2005 | Scannell | 235/462.01 |
| 7,426,424 B2 | * | 9/2008 | Moriguchi | 700/214 |
| 7,726,038 B2 | * | 6/2010 | Reusing | 33/706 |
| 2009/0021244 A1 | * | 1/2009 | May | 324/207.2 |

FOREIGN PATENT DOCUMENTS

| | | | | |
|---|---|---|---|---|
| CN | 1553138 A | * | 12/2004 | |
| CN | 1844848 A | * | 10/2006 | |
| CN | 200941246 Y | * | 8/2007 | |
| GB | 2226720 A | * | 7/1990 | |
| JP | 02035308 A | * | 2/1990 | |
| SU | 624872 A | * | 8/1978 | |

* cited by examiner

*Primary Examiner*—R. A. Smith
(74) *Attorney, Agent, or Firm*—Matthias Scholl P.C.; Matthias Scholl

(57) ABSTRACT

An electronic coordinatometer, including multiple buses, and multiple connecting plates. The bus is formed by multiple rulers connected via the connecting plates, and the rulers have the same length. The coordinatometer is not affected by environment noise or fluctuation of signal level, and is capable of stably operating in harsh environments. Moreover, the coordinatometer is light and no hoisting equipment is required. Production, transportation and installation of the coordinatometer are convenient.

16 Claims, 5 Drawing Sheets

ELECTRONIC COORDINATOMETER

CROSS-REFERENCE TO RELATED APPLICATIONS

This application is a continuation of International Patent Application No. PCT/CN2008/071935 with an international filing date of Aug. 8, 2008, designating the United States, now pending, and further claims priority benefits to Chinese Patent Application No. 200810048392.3 filed on Jul. 11, 2008. The contents of all of the aforementioned applications, including any intervening amendments thereto, are incorporated herein by reference

BACKGROUND OF THE INVENTION

1. Field of the Invention

The invention relates to a measuring device, and more particularly to an electronic coordinatometer.

2. Description of the Related Art

Induction radio technology is widely used in modern industries for detecting positions of mechanical equipments. A bus is an important part in the induction radio technology. However, a non-neglectable problem with the existing bus is that it is heavy and needs a hoisting equipment for transportation.

SUMMARY OF THE INVENTION

In view of the above-described problem, it is one objective of the invention to provide an electronic coordinatometer having a bus that is light and requires no hoisting equipment for transportation.

To achieve the above objectives, in accordance with one embodiment of the invention, provided is an electronic coordinatometer, comprising multiple buses, and multiple connecting plates, wherein the bus is formed by multiple rulers connected via the connecting plates, and the rulers have the same length.

In a class of this embodiment, the ruler comprises a top portion, a bottom portion, at least two line frames, and a pair of end frames.

In a class of this embodiment, the line frame is disposed on the bottom portion and operates to receive wires.

In a class of this embodiment, the end frames are disposed on both ends of the bottom portion.

In a class of this embodiment, a connecting terminal is led out from the end frame and connected to the bus and the connecting plate.

In a class of this embodiment, the line frame comprises at least a rectangular frame.

In a class of this embodiment, a slot is disposed on each side of the rectangular frame and operates to receive a wire.

In a class of this embodiment, a wrapping post is disposed in the vicinity of each endpoint of the rectangular frame.

In a class of this embodiment, a second line card is disposed between the line frame and the wrapping post.

In a class of this embodiment, a first line card is disposed between adjacent line frames.

In a class of this embodiment, a length of the line frame is 200 mm, and a length of the end frame is 40 mm.

In a class of this embodiment, 31 line frames are disposed on the bottom portion.

In a class of this embodiment, the connecting plate comprises a connecting cover, a connecting base, and a circuit board.

In a class of this embodiment, the circuit board is connected to the connecting base.

In a class of this embodiment, a connecting portion is disposed in the connecting base, and operates to connect a printed conductor on the circuit board to the connecting terminal.

In a class of this embodiment, a length of the ruler is 6.28 m, and a length of the connecting board is 0.12 m.

Advantages of the invention comprise: 1) the invention is not affected by environment noise or fluctuation of signal level, and is capable of stably operating in hostile environment; 2) the invention is light, and no hoisting equipment is required; 3) production, transportation and installation of the invention are convenient.

BRIEF DESCRIPTION OF THE DRAWINGS

The invention is described hereinafter with reference to accompanying drawings, in which.

Figure 1:
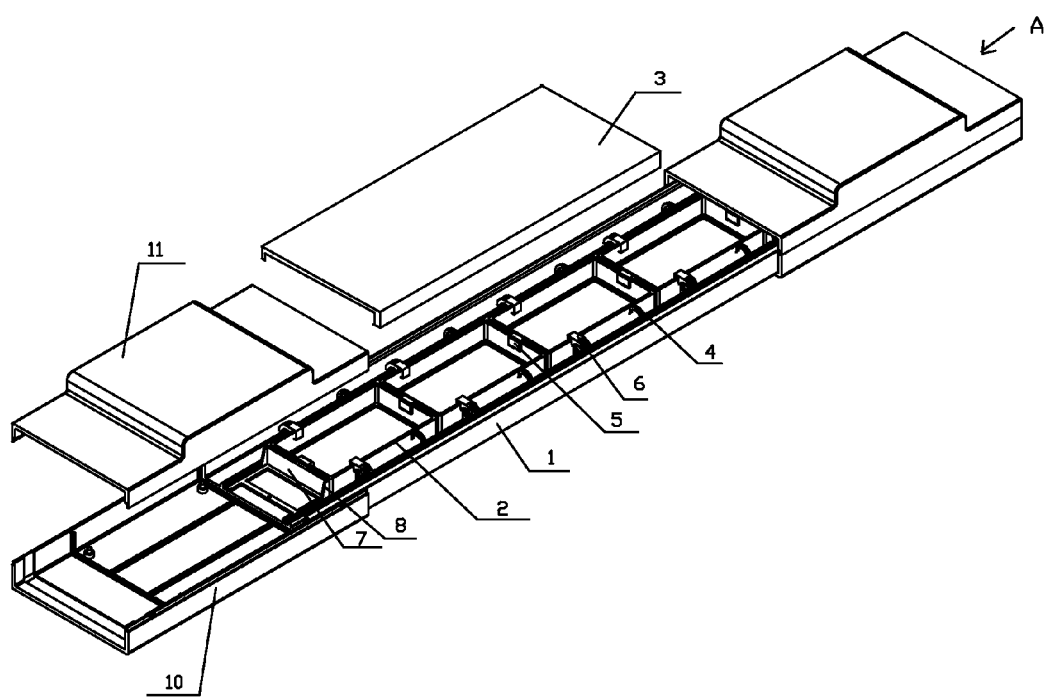
FIG. 1 is a schematic view of an electronic coordinatometer of an exemplary embodiment of the invention.
Figure 2:
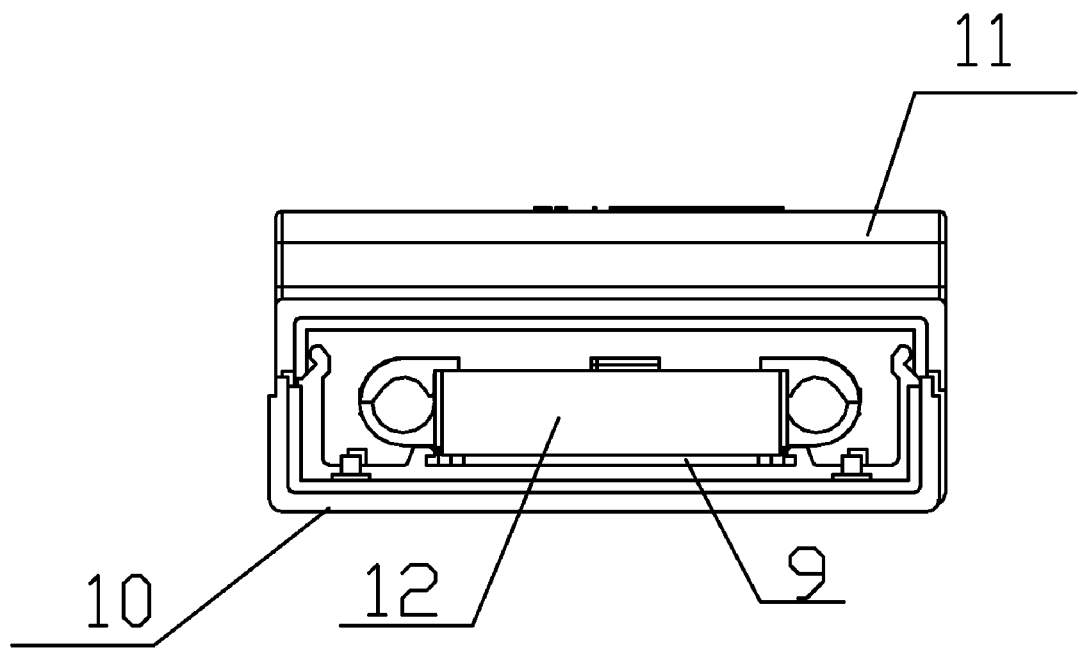
FIG. 2 is a schematic view of an electronic coordinatometer of FIG. 1 in the A direction.
Figure 3:
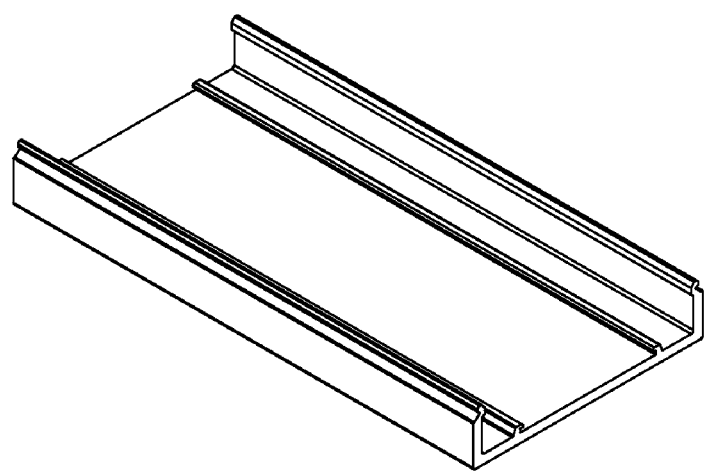
FIG. 3 is a schematic view of a bottom portion of a ruler.
Figure 4:
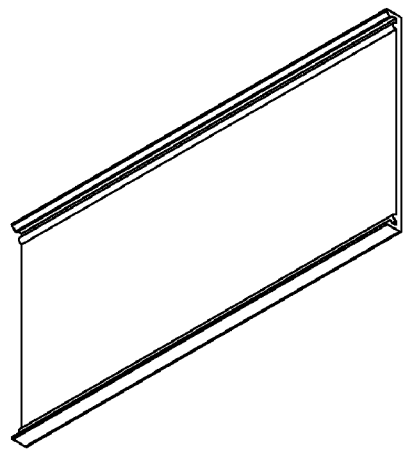
FIG. 4 is a schematic view of a top portion of a ruler.
Figure 5:
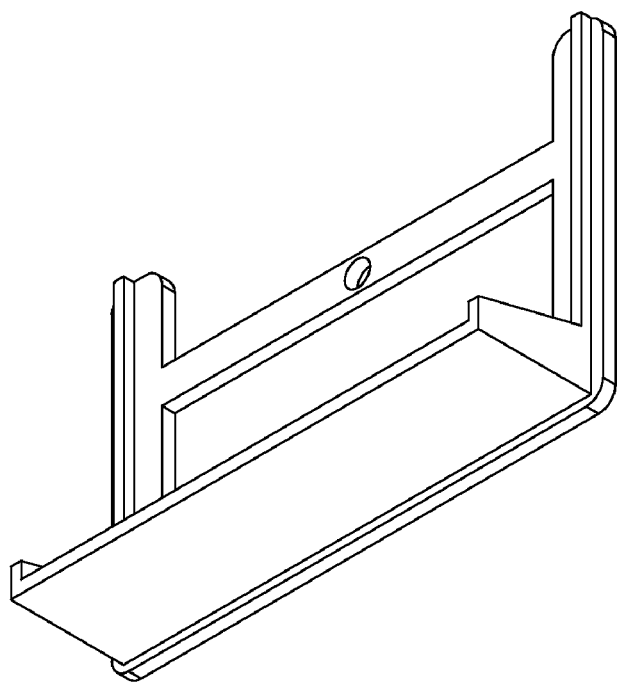
FIG. 5 is a schematic view of an end frame of a ruler.
Figure 6:
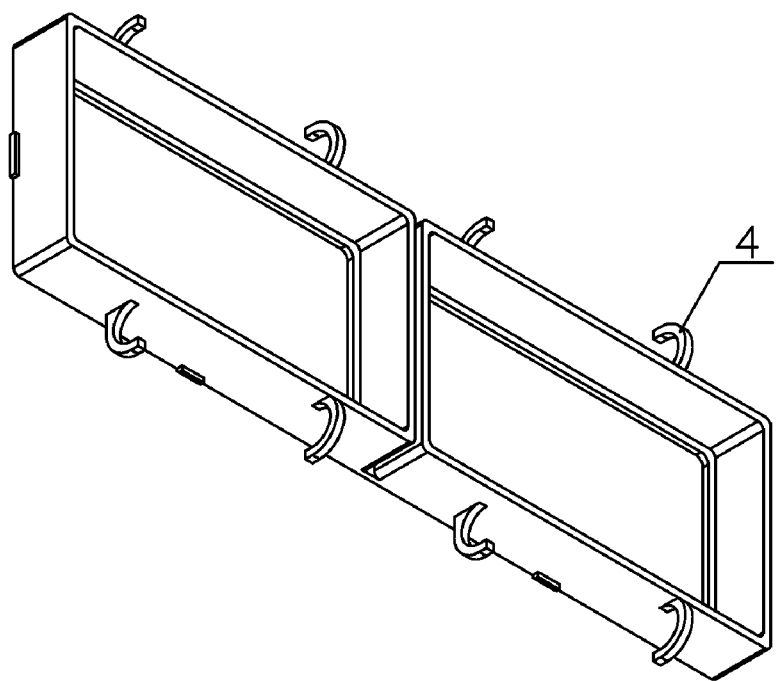
FIG. 6 is a schematic view of a line frame of a ruler.
Figure 7:
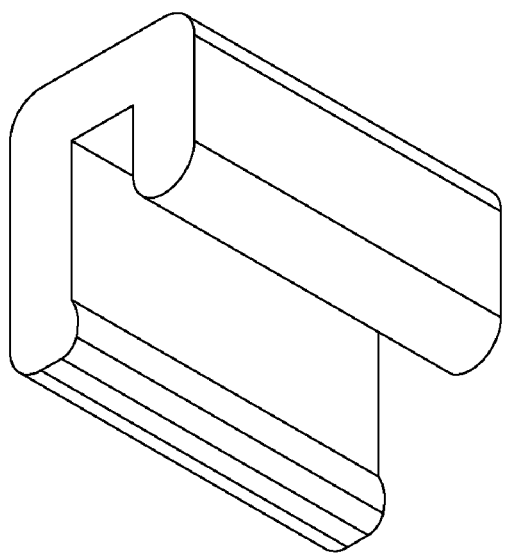
FIG. 7 is a schematic view of a first line card.
Figure 8:
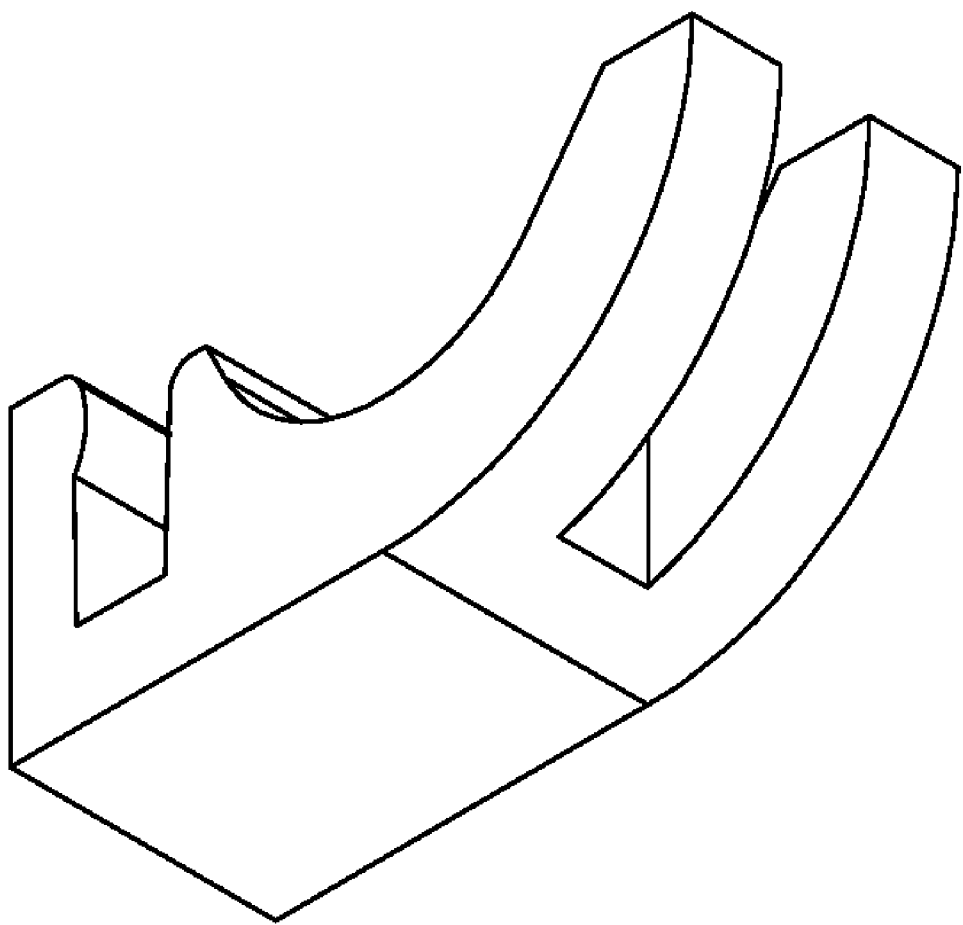
FIG. 8 is a schematic view of a second line card.

In which:

1—bottom portion 2—line frame 3—top portion 4—wrapping post 5—first line card 6—second line card 7—end frame 8—connecting terminal 9—circuit board 10—connecting base 11—connecting cover 12—connecting portion

DETAILED DESCRIPTION OF THE EMBODIMENTS

An electronic coordinatometer of the invention comprises multiple buses, and multiple connecting plates. The bus is formed by multiple rulers connected via the connecting plates, and the rulers have the same length.

The ruler comprises a bottom portion 1, at least two line frame 2, a top portion 3, and a pair of end frames 7. The line frame 2 is disposed on the bottom portion 1 and operates to receive wires. The end frames 7 are disposed on both ends of the bottom portion 1. A connecting terminal 8 is led out from the end frame 7 and connected to the bus and the connecting plate.

The line frame 2 comprises at least a rectangular frame, a slot is disposed on each side of the rectangular frame and operates to receive a wire, and a wrapping post 4 is disposed in the vicinity of each endpoint of the rectangular frame.

A first line card 5 is disposed between adjacent line frames 2. A second line card 6 is disposed between the line frame 2 and the wrapping post 4.

In this embodiment, a length of the line frame 2 is 200 mm, a length of the end frame 7 is 40 mm, a length of the ruler is 6.28 m, a length of the connecting board is 0.12 m, and the number of the line frames 2 is 31.

The connecting plate comprises a connecting cover 11, a connecting base 10, and a circuit board 9. The circuit board 9 is fixed on the connecting base 10.

A connecting portion 12 is disposed on the circuit board 9, and operates to connect a printed conductor on the circuit board to the connecting terminal 8.

The first line card 5 and the second line card 6 operate to fix wires on the line frame 2.

The ruler and the connecting plate are sealed via rubber rings whereby preventing water from entering therein.

In the ruler, wires are wrapped on the line frame 2 in a form of Gray codes whereby indicating absolute position information.

In operation, an antenna is moved in parallel to the electronic coordinatometer, and a distance therebetween is 30-300 mm. The antenna implements measuring and positioning via the ruler based on a principle of contactless electromagnetic induction.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An electronic coordinatometer, comprising
   multiple buses; and
   multiple connecting plates;
   wherein
   said bus is formed by multiple rulers connected via said connecting plates; and
   said rulers have the same length.

2. The electronic coordinatometer of claim 1, wherein said ruler comprises a top portion, a bottom portion, at least two line frames, and a pair of end frames.

3. The electronic coordinatometer of claim 2, wherein said line frame is disposed on said bottom portion and operates to receive wires.

4. The electronic coordinatometer of claim 2, wherein said end frames are disposed on both ends of said bottom portion.

5. The electronic coordinatometer of claim 2, wherein a connecting terminal is led out from said end frame and connected to said bus and said connecting plate.

6. The electronic coordinatometer of claim 2, wherein said line frame comprises at least a rectangular frame.

7. The electronic coordinatometer of claim 6, wherein a slot is disposed on each side of said rectangular frame and operates to receive a wire.

8. The electronic coordinatometer of claim 6, wherein a wrapping post is disposed in the vicinity of each endpoint of said rectangular frame.

9. The electronic coordinatometer of claim 8, wherein a second line card is disposed between said line frame and said wrapping post.

10. The electronic coordinatometer of claim 2, wherein a first line card is disposed between adjacent line frames.

11. The electronic coordinatometer of claim 2, wherein a length of said line frame is 200 mm, and a length of said end frame is 40 mm.

12. The electronic coordinatometer of claim 2, wherein 31 line frames are disposed on said bottom portion.

13. The electronic coordinatometer of claim 1, wherein said connecting plate comprises a connecting cover, a connecting base, and a circuit board.

14. The electronic coordinatometer of claim 13, wherein said circuit board is connected to said connecting base.

15. The electronic coordinatometer of claim 13, wherein a connecting portion is disposed in said connecting base, and operates to connect a printed conductor on said circuit board to said connecting terminal.

16. The electronic coordinatometer of claim 1, wherein a length of said ruler is 6.28 m, and a length of said connecting board is 0.12 m.

* * * * *